United States Patent [19]

Okada

[11] 4,421,888
[45] Dec. 20, 1983

[54] SUSTAINED HIGH ARC RESISTANT POLYESTER COMPOSITION

[75] Inventor: Tsuneyoshi Okada, Fuji, Japan

[73] Assignee: Celanese Corporation, New York, N.Y.

[21] Appl. No.: 363,676

[22] Filed: Mar. 30, 1982

[51] Int. Cl.$^3$ .............................................. C08L 67/02
[52] U.S. Cl. .................................. 524/371; 524/451; 524/605; 524/539; 524/412
[58] Field of Search ................ 523/521, 527; 524/371, 524/539, 605, 451, 412

[56] References Cited

U.S. PATENT DOCUMENTS

| | | | |
|---|---|---|---|
| 3,516,957 | 6/1970 | Gray | 524/605 |
| 3,671,487 | 6/1972 | Abolins | 524/80 |
| 3,740,245 | 6/1973 | White | 106/306 |
| 3,859,246 | 1/1975 | Jackson | 524/605 |
| 3,867,336 | 2/1975 | Fox | 524/371 |
| 4,010,219 | 3/1977 | Aoyama | 524/371 |
| 4,035,333 | 7/1977 | Kamada | 524/410 |
| 4,044,073 | 8/1977 | Baron | 524/371 |
| 4,052,356 | 10/1977 | Breitenfellner | 524/605 |
| 4,070,332 | 1/1978 | Morikawa | 523/521 |
| 4,111,892 | 9/1978 | Kamada | 524/521 |
| 4,191,678 | 3/1980 | Smith | 524/371 |
| 4,257,937 | 3/1981 | Cohen | 524/539 |
| 4,296,021 | 10/1981 | Wambach | 524/605 |

FOREIGN PATENT DOCUMENTS

| | | | |
|---|---|---|---|
| 51-70251 | 6/1976 | Japan | 524/371 |
| 52-58752 | 5/1977 | Japan | |

*Primary Examiner*—John C. Bleutge
*Assistant Examiner*—Patricia Short
*Attorney, Agent, or Firm*—Maria C. H. Lin

[57] ABSTRACT

In an article molded from a non-burning, non-dripping filled polyester composition having a high level of arc resistance and tracking resistance, decay in the arc resistance with time is substantially decreased or prevented by incorporating a minor but critical amount of polyethylene terephthalate. Typical compositions comprise (a) approximately 30 to 60 percent by weight, based on the composition, of a mixture of polyethylene terephthalate and polybutylene terephthalate wherein polyethylene terephthalate comprises approximately 3 to 20 percent by weight; (b) approximately 30 to 60 percent by weight of the composition of a mixture of fiber glass and talc wherein talc comprises approximately 15 to 35 percent by weight of the composition; and (c) an effective amount, up to 20 percent by weight of the composition of a flame retardant additive or a mixture thereof. Typical compositions possess superior electrical properties, comparable to those of thermosetting molding resins.

13 Claims, No Drawings

SUSTAINED HIGH ARC RESISTANT POLYESTER COMPOSITION

INTRODUCTION

The present invention is concerned with thermoplastic polyester resin compositions which retain their high voltage breakdown resistance. More particularly, it relates to compositions comprising a flame resistant, fiber glass reinforced polyester blend which can be molded to give articles having sustained, high levels of arc and tracking resistance and, further, a method for substantially decreasing or preventing the decay of arc resistance with time. The polyester compositions of the present invention can be advantageously employed in the electrical/electronics industry to provide parts for electrical switches, such as circuit breakers and the like, containing live current handling components wherein a high level of arc resistance and tracking resistance, together with good mechanical properties, are desired.

BACKGROUND OF THE INVENTION

Hithertofore, thermosetting molding resins, principally diallyl phthalate resins (DA), alkyd resins and phenolic resins, have been employed in the electrical/electronics industry where a high level of arc resistance, tracking resistance together with excellent mechanical, chemical and thermal properties are necessary. However, thermosetting molding resins are more difficult to process than thermoplastic resins, since they usually require higher molding temperatures or longer cycle times, or both. Furthermore, articles molded from thermosetting molding resins cannot be recycled and remolded. For these reasons, it is desirable to supplant the earlier-developed thermosetting materials in electrical/electronics applications with thermoplastic molding compositions. Until the present invention, there are no known thermoplastic molding compositions which retain sufficiently high levels of arc resistance and tracking resistance to replace the thermosetting molding resins in the area of electrical switches, such as circuit breakers, wherein a very high level of arc resistance and tracking resistance is needed.

Thermoplastic polyesters, such as polybutylene terephthalate, are known to provide excellent molding compositions. Such compositions can be molded at low to moderate temperatures and rapid cycle times, to give molded articles having superior chemical resistance, thermal stability and product appearance, together with good mechanical strength, stiffness, low friction and wear properties and good resistance to fracture.

Numerous patents including British Pat. No. 1,060,401, published Mar. 1, 1967 and assigned to Kurashiki Rayon; Belgian Patent No. 747,243, issued Sept. 14, 1970 to Celanese Corporation; and U.S. Pat. No. 3,953,394, issued Apr. 27, 1976 to Fox and assigned to General Electric Company disclosed blends of polybutylene terephthalate and polyethylene terephthalate. Such blends can also include known reinforcing agents and flame retardants.

It is further known that the mechanical strength and processibility of polyester resins and resin blends can be improved by the incorporation of fiber glass and talc. The use of these additives for this purpose is disclosed, for example, in U.S. Pat. No. 3,931,094, issued Jan. 6, 1976 to Segal et al and assigned to Allied Chemical Corp.; U.S. Pat. No. 4,113,692, issued Sept. 12, 1978 to Wambach and assigned to General Electric Co.; U.S. Pat. No. 4,212,791, issued July 15, 1980 to Avery et al and assigned to Rohm and Haas; U.S. Pat. No. 4,257,937, issued Mar. 24, 1981 to Cohen and U.S. Pat. No. 4,267,286, issued May 12, 1981 to Campbell and both assigned to General Electric Co.; U.S. Pat. No. 4,271,063, issued June 2, 1981 to Borman et al and U.S. Pat. No. 4,271,064, issued June 2, 1981 to Dieck and both assigned to General Electric Co.; U.S. Pat. No. 4,277,391, issued July 7, 1981 to Charles and assigned to GAF Corp.; U.S. Pat. No. 4,280,005, issued July 21, 1981 to Fox and assigned to General Electric Co.; and U.S. Pat. No. 4,284,550, issued Aug. 18, 1981 to Mizuno et al and assigned to Dainippon Ink and Chemicals Inc.

Flame retardant polyester resin compositions are disclosed in, among others, U.S. Pat. Nos. 3,931,094; 4,113,692; 4,212,791; 4,257,937; 4,267,286; 4,271,063; 4,271,064; and 4,284,550 mentioned above. The use of decabromobiphenylether as one component of an effective flame retardant additive package for polyester molding resins is specifically disclosed in U.S. Pat. Nos. 3,971,752, issued July 27, 1976 to Aoyama and assigned to Toray Ind., Inc.; 4,280,005, mentioned above; and in Defensive Publication T918001. The use of polytetrafluoroethylene as a drip suppressant is disclosed in U.S. Pat. No. 3,671,487, issued June 20, 1972 to Abolins and assigned to General Electric Co.

U.S. Pat. No. 3,624,024 issued Nov. 30, 1971 to Caldwell and assigned to Eastman Kodak Co. discloses that incorporating talc into flame retardant polybutylene terephthalate compositions containing a brominated additive can increase the heat distortion temperature of articles molded therefrom.

Polyester resin molding compositions with improved arc resistance are described, for example, in U.S. Pat. No. 4,052,356, issued Oct. 4, 1977 to Breitenfellner et al and assigned to Ciba Geigy A.G. This patent discloses reinforced polybutylene terephthalate compositions containing kaolin from which molded articles having an arc resistance of 80–125 sec. and a tracking resistance of 250–275 volts can be obtained. U.S. Pat. No. 4,035,333, issued July 12, 1977 to Kamada et al and assigned to Mitsubishi Rayon Co. Ltd., discloses that polybutylene terephthalate molding compositions containing sodium antimonate or a sodium antimonate-antimony trioxide mixture together with talc provide molded articles having improved arc resistance. Japanese Published Patent Application No. 52-58752/1977 discloses flame resistant polyester molding compositions containing mineral fillers and fiber glass to provide a resin with an improved arc resistance.

It has been found that flame retardant polybutylene terephthalate resin compositions filled with approximately 30 to 60 percent by weight of fiber glass and talc will provide articles molded therefrom with an arc resistance of at least 150 sec. and a tracking resistance of at least 400 volts. However, it was also found that the high level of arc resistance obtained initially decays over time to a level where the usefulness of the resin would be impaired.

There is, thus, a need for an improved flame resistant thermoplastic polyester resin composition with a sustained high level of arc resistance and tracking resistance, either of which will not substantially decay over time.

It is, therefore, an object of the invention to provide an economical thermoplastic resin material which retains a high level of arc and tracking resistance for use in the electrical and electronics industry as parts for electrical switches, such as circuit breakers and the like.

It is another object of the invention that the thermoplastic resin molding material possesses superior mechanical strength, stiffness and good resistance to fracture.

It is a further object of the invention that the thermoplastic resin molding mateial possesses superior chemical resistance, thermal stability and product appearance.

It is also an object of the invention to provide a thermoplastic resin molding material which is processible at low to moderate temperatures with rapid cycle times.

It is a further object of the invention to provide a thermoplastic resin material which will be flame resistant especially under use conditions when subjected to high voltage or high current.

It is also an object of the invention that the thermoplastic resin material will be highly resistant to the passage of electricity on its surface when a high voltage of electricity is applied to conductors imbedded in the resin material, i.e., the resin has a high level of arc resistance, at least 150 sec. and a high level of tracking resistance, at least 400 volts.

SUMMARY OF THE INVENTION

According to this invention, it has been found surprisingly that incorporating a minor but critical amount of polyethylene terephthalate into a polybutylene terephthalate molding composition having a high level of arc resistance and tracking resistance will substantially decrease or prevent the decay of the high level of arc resistance initially obtained. The composition comprises an intimate blend of:

(A) approximately 30 to 60 percent by weight based on the composition, of a blend of polybutylene terephthalate and polyethylene terephthalate, wherein polyethylene terephthalate comprises approximately 3 to 20 percent by weight of the composition;

(B) approximately 30 to 60 percent by weight of the composition of a mixture of talc and fiber glass, wherein talc comprises about 15 to 35 percent by weight of the composition;

(C) an effective amount, up to 20 percent by weight of the composition, of a flame retardant or flame retardant mixture, such that the composition would be non-burning and non-dripping in accordance with the test procedure of Underwriters Laboratory Bulletin No. 94 at 1/32" thickness; and (D) optionally, other additives such as mold release agents, lubricants, impact modifiers, pigments and the like.

DETAILED DESCRIPTION OF THE INVENTION

The present invention relates to a non-burning, non-dripping polyester blend composition with a high level of arc resistance and tracking resistance which will not decay with time. As used herein, the term "non-burning, non-dripping" is used to describe compositions which meet the standards of ASTM test method D-625 and Underwriters Laboratory Bulletin Number 94 (UL-94).

The Linear Aromatic Polyesters

The linear aromatic polyesters to be used in accordance with this invention include polybutylene terephthalate and polyethylene terephthalate.

The preparation of such terephthalate polymers are described in U.S. Pat. No. 2,465,319 entitled "Polymeric Linear Terephthalate Esters." Generally, these polymers are prepared by the direct esterification of terephthalic acid with an appropriate diol followed by polycondensation or transesterification of dimethyl terephthalate with a diol followed by polycondensation. For polyethylene terephthalate, ethylene glycol is used, and, for polybutylene terephthalate, tetramethylene glycol.

Polybutylene terephthalate compositions with improved arc resistances are known. However, on standing at room temperature, it was found that the arc resistance of such compositions decays quickly. For example, a drop of as much as 30 percent, from 182 sec. to 129 sec., in arc resistance can take place over a period of a month when a molded disc without polyethylene terephthalate has been left standing at ambient conditions, i.e., at about 73° F. and 50 percent relative humidity. According to this invention, it has been found surprisingly, that a minor but critical amount of polyethylene terephthalate can be incorporated into the composition to prevent decay of the high level of arc resistance initially obtained. For example, when 3 to 20 percent by weight of polyethylene terephthalate is incorporated into the composition, unexpectedly the decay of the initial high level of arc resistance is substantially decreased, i.e., the arc resistance remained at the initial high level. It is preferable to incorporate from about 5 to 15 percent of the polyethylene terephthalate into the composition.

The total amount of polyester resin present in the composition, i.e., polybutylene terephthalate and polyethylene terephthalate should be at least about 30 percent by weight of the composition. Otherwise, moldability becomes poor. On the other hand, if the total amount of polyester resin present exceeds about 60 percent by weight, the desired level of arc resistance will not be retained.

Talc and Fiber Glass

Various grades of talc are available commercially. For example, Talc MP-25 is available from Pfizer Inc. The amount of talc in the composition is in the range of 15 to 35 percent by weight, preferably in the range of 25 to 35 percent by weight.

The fiber glass used in the invention should preferably be lime-aluminum borosilicate glass that is relatively soda free and is known as "E" glass. It can be used in any of the commercially available forms: bundles, yarns, ropes, rovings, mats or the like. The length of the fibers are not critical to the invention. It is convenient to use fiber glass in the form of chopped strands from about ⅛ inch to about 1 inch long, preferably, less than ¼ inch long. In articles molded from the compositions, even shorter lengths will be encountered because, during compounding, considerable fragmentation will occur. The glass fibers in the composition are present in the range of about 15 to 30 percent by weight, preferably from about 15 to 25 percent by weight, based upon the total weight of the composition.

It has been found that a mixture of both talc and fiber glass must be present in the composition to provide the desired mechanical and electrical properties. The combined amount of both components should be from about 30 to 60 percent by weight, preferably from about 40 to 55 percent by weight, most preferably about 50 percent by weight, based upon the total weight of the composition.

Flame Retardants

The composition of the present invention also includes a halogen-containing organic flame retardant compound.

Among the useful halogen-containing compounds are those of the formula:

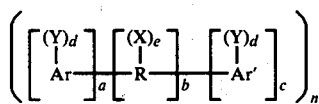

wherein n is 1 to 10 and R is an alkylene, alkylidene or cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of ether, carbonyl, and carbamate; a sulfur-containing linkage (e.g., sulfide, sulfoxide, sulfone); a phosphorous-containing linkage; and the like. R can also consist of two or more alkylene or alkylidene linkages connected by such groups as aromatic radical, ether, ester, carbonyl, sulfide, sulfoxide, sulfone, a phosphorous-containing linkage, and the like. R can be a dihydric phenol (e.g., bisphenol-A) carbonate linkage. Other groups which are represented by R will occur to those skilled in the art.

Ar and Ar' are mono- or polycarbocylic aromatic groups such as phenylene, biphenylene, terephenylene, naphthylene, and the like. Ar and Ar' may be the same or different.

Y is a substituent selected from the group consisting of organic, inorganic, or organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., with such other substituents being essentially inert provided there be at least one and preferably two halogen atoms per aryl (e.g., phenyl) nucleus.

X is a monovalent hydrocarbon group exemplified by the following: alkyl, such a methyl, ethyl, propyl, isopropyl, butyl, decyl, and the like; aryl groups, such as phenyl, naphthyl, biphenyl, xylyl, tolyl, and the like, aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to the maximum number of replaceable hydrogens on R. The letters, a, b, and c represent whole numbers including 0. When b is not 0, neither a nor c may be 0. Otherwise, either a or c, but not both, may be 0. Where b is 0, the aromatic groups are joined by a direct carbon-to-carbon bond.

The hydroxyl and Y substituents on the aromatic groups Ar and Ar' can be in the ortho, meta, or para positions on the aromatic rings, and the groups can be in any possible geometric relationship with respect to one another.

Included within the scope of the above formula are diaromatics of which the following are representative:
2,2-bis(3,5-dichlorophenyl)propane
bis(2-chlorophenyl)methane
bis(2,6-dibromophenyl)methane
1,1-bis(4-iodophenyl)ethane
1,2-bis(2,6-dichlorophenyl)ethane
1,1-bis(2-chloro-4-iodophenyl)ethane
1,1-bis(2-chloro-4-methylphenyl)ethane
1,1-bis(3,5-dichlorophenyl)ethane
2,2-bis(3-phenyl-4-bromophenyl)ethane
2,3-bis(4,6-dichloronaphthyl)propane
2,2-bis(2,6-dichlorophenyl)pentane
2,2-bis(3,5-dichlorophenyl)hexane
bis(4-chlorophenyl)phenylmethane
bis(3,5-dichlorophenyl)cyclohexylmethane
bis(3-nitro-4-bromophenyl)methane
bis(4-hydroxy-2,6-dichloro-3-methoxyphenyl)methane
2,2-bis(3,5-dichloro-4-hydroxyphenyl)propane
2,2-bis(3-bromo-4-hydroxyphenyl)propane.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4-dichlorobiphenyl, hexabromobiphenyl, octabromobiphenyl, decabromobiphenyl, and halogenated diphenyl ethers, containing 2 to 10 halogen atoms, such as decabromodiphenylether.

Another class of suitable flame retardants which are not necessarily embraced by the above formula are non-exuding flame retardants. Examples of such flame retardants are halogenated polystyrene (e.g., brominated polystyrene available from Ferro Chem. under the tradename Pyro Chek 68 PB); bis(tetra-bromophthalalimide)ethane, available as Saytex BT-93 from Saytech, Inc. and polydibromophenylene oxide, available as Velsicol 935 from Velsicol Chem., Inc.

The preferred halogen compounds for this invention are the halogenated diphenyl ethers. Especially preferred is decabromodiphenylether, either alone or in combination with other halogen-containing organic flame retardants.

The amount of flame retardant used is not critical to the invention, as long as it is present in a minor proportion based on the composition (major proportions detract from physical properties). The amount of flame retardant used is at least sufficient to render the composition non-burning. In general, the amount of flame retardant will be from about 4 to 15 percent by weight, based upon the total weight of the composition, preferably, 4 to 10 percent by weight. In an especially preferred embodiment, the flame retardant used is about 5 percent by weight, based upon the total weight of the composition, of decabromodiphenylether.

The composition of the present invention further comprises a compound of antimony, especially antimony trioxide which is known to co-act synergistically with decabromodiphenylether to provide flame retardancy to polyesters. For the purposes of the present invention, the preferred antimony trioxide source comprises a reaction product of antimony trioxide and talc. Such a product is disclosed in U.S. Pat. No. 3,740,245, which is herein incorporated by reference. Briefly, the antimony trioxide (or compound of antimony which generates antimony trioxide) and the hydrous compound of silicon are reacted in a weight ratio of about 1:1 to 1:4, on an antimony trioxide:substrate basis, at a critical temperature within the range of about 400° to 550° C. in an oxygen containing atmosphere. The reaction product is a particulate solid which is non-abrasive and which is compatible with plastics. Further details regarding the product and the process of making the same may be found in the above-identified patent.

In an especially preferred embodiment, the product comprises the reaction product of approximately 25 percent by weight of antimony trioxide and approximately 75 percent by weight of talc. This product is now available commercially under the trademark Oncor 75 RA from Anzon America, Inc. In another especially preferred embodiment, the product comprises the reaction product of approximately 45 percent by weight of antimony trioxide and approximately 55 percent by weight of talc. This product is now available commercially under the trademark Oncor 55 from Anzon America, Inc.

The product described above is employed in the composition of the present invention in an amount sufficient to provide the well known synergistic flame retardant effect due to the interaction of the antimony trioxide and the halogen-containing organic flame retardant. Preferably, the amorphous non-abrasive reaction product is employed in a concentration within the range of approximately 2 to 10 percent by weight, based upon the total weight of the composition.

In the composition of the present invention, the amorphous reaction product described above may be utilized in admixture with antimony trioxide. When such a mixture is utilized, the amorphous reaction product comprises at least 50 percent by weight of the mixture, and the mixture comprises approximately 4 to 10 percent by weight (e.g., approximately 5 percent by weight) of the polyester blend composition.

Typically, the reaction product, or mixture of reaction product and antimony trioxide, is employed in a concentration substantially equal to that of the halogen-containing organic flame retardant. In a preferred embodiment, the reaction product, or the aforementioned mixture, is employed in a concentration of approximately 5 percent by weight, based upon the total weight of the composition.

The composition of the present invention optionally may also include a polytetrafluoroethylene resin in order to further retard dripping of flaming resin. The polytetrafluoroethylene resins are commercially available or can be prepared by known processes. They are white solids obtained by the radical initiated polymerization of tetrafluoroethylene in aqueous media with free radical catalyst (see, for example, U.S. Pat. No. 2,393,967). Preferred polytetrafluoroethylene resins are available commercially from the DuPont Company under the trademark Teflon K.

The polytetrafluoroethylene utilized in the composition of the present invention are present in an amount at least sufficient to render the composition non-dripping when burning. For example, the polytetrafluoroethylene resins may be present in an amount within the range of approximately 0 to 2.5 percent by weight (more preferably, within the range of approximately 0.5 to 2.5 percent by weight).

In addition, it is permissible to add other resins, such as a methyl methacrylate resin, a stabilizing agent, a coloring agent, a lubricating agent, a mold release agent, an ultraviolet absorption agent, etc. The ratio of such an additive/additives is preferably less than 10 percent by weight with respect to the composition. In the compositions of this invention, a mold release agent, ethylene bis-stearamide was incorporated. Ethylene bis-stearamide is available commercially from Glyco Inc. under the trademark Acrawax. An acrylic resin, trademarked Lucite by the DuPont Company was also added to one of the formulations.

The method of preparing the composition of the present invention is not critical and can be carried out by conventional techniques. As discussed above, one convenient method for blending a polyester resin comprises blending the resin in powder or granular form, extruding the blend, and comminuting the blend into pellets or other suitable shapes. The reinforcements and other additives can be added in any usual manner, e.g., by drying mixing or by mixing in the melted state in an extruder, a heated mill, or in other mixers.

By way of illustration, glass roving (a bundle of strands of filaments) can be chopped into small pieces, e.g., ¼ inch to 1 inch in length, preferably less than ¼ inch in length, and put into an extrusion compounder with polyester resins, the halogen-containing organic flame retardant component, the antimony-containing component, and, if used, the polytetrafluoroethylene and/or Acrawax to produce molding pellets.

The compositions can be molded in any equipment conventionally used for reinforced thermoplastic compositions. For example, good results are obtained in an injection molding machine with conventional cylinder temperatures and conventional mold temperatures. Depending upon the molding properties of the composition, the amount of reinforcing agent, and the rate of crystallization of the polyester resin blend, those skilled in the art will be able to make the conventional adjustments in molding cycles to accommodate the composition.

The composition in accordance with the present invention may be employed as a molding material. It is especially preferred for use as a material for injection molding and extrusion molding.

A molded product obtained from the composition in accordance with the present invention is flame-retardant and has high arc resistance, and high voltage tracking resistance. Further, the decay of the initial high arc resistance obtained is substantially decreased or prevented.

Therefore, in another aspect of this invention, a process is provided for substantially decreasing or preventing the decay of arc resistance in a fiber glass reinforced, non-burning, non-dripping polyester blend composition. The composition to which the process is applicable comprise: (a) approximately 30 to 60 percent by weight based on the composition of a blend of polybutylene terephthalate; (b) approximately 30 to 60 percent by weight based on the composition of a mixture of fiber glass and talc, wherein talc comprises approximately 15 to 35 percent by weight of the composition; and (c) an effective amount, up to 20 percent by weight of the composition, of a flame retardant additive or a mixture thereof. The compositions which are useful in the process of the present invention may further comprise polytetrafluoroethylene or other optional ingredients as discussed above. The process comprises replacing approximately 3 to 20 percent by weight of the polybutylene terephthalate, based on the composition, with polyethylene terephthalate. Preferably approximately 5 to 15 percent of the polybutylene terephthalate is replaced with polyethylene terephthalate.

The following Examples are presented as specific illustrations of the claimed invention. It should be understood, however, that the invention is not limited to the specific details set forth in the Examples.

EXAMPLES 1 TO 4

Four polyester resin compositions were prepared. The percentage weight of the various components together with their electrical properties, mechanical and flammability properties are presented in Table I.

TABLE I

| FORMULATION | 1 | 2 | 3 | 4 |
|---|---|---|---|---|
| PBT* | 39.6 | 29.6 | 44.45 | 34.45 |
| PET* | — | 10.0 | — | — |
| Fiber Glass | 20.0 | 20.0 | 20.0 | 20.0 |
| Talc | 30.0 | 30.0 | 30.0 | 30.0 |
| DBDPE* | 4.85 | 4.85 | — | — |
| Oncor 55 | 4.85 | 4.85 | 4.85 | 4.85 |
| Teflon-K | 0.5 | 0.5 | 0.5 | 0.5 |
| Acrawax | 0.2 | 0.2 | 0.2 | 0.2 |
| Acrylic | 0 | 0 | 0 | 10 |
| Electrical Property | | | | |
| Arc Resistance, sec. | | | | |
| Initial | 182 | 182 | 174 | 180 |
| After Aging | 164 | 182 | — | — |
| CTI, volts | ≧600 | ≧600 | ≧600 | ≧600 |
| Mechanical properties | | | | |
| Tensile strength, psi | 9,900 | 11,700 | 11,200 | 9,700 |
| Tensile elongation, % | 0.6 | 0.7 | 0.6 | 0.4 |
| Flexural strength, psi | 15,800 | 17,200 | 16,800 | 14,100 |
| Flexural modulus, psi | $1.9 \times 10^6$ | $2.0 \times 10^6$ | $2.0 \times 10^6$ | $2.0 \times 10^6$ |
| Notched Izod, ft-lb/in. | 0.8 | 0.8 | 0.7 | 0.7 |
| Flammability | V-O | V-O | — | — |

*PBT = polybutylene terephthalate
PET = polyethylene terephthalate
DBDPE = decabromodiphenylether It can be seen that polyester resin compositions having 20 percent fiber glass and 30 percent talc exhibit excellent electrical properties, good mechanical properties and flame retardancy.

Example 2 included 10 percent by weight of polyethylene terephthalate. Talc was obtained from Pfizer Corporation decabromodiphenylether was obtained from Great Lakes Chemical Corporation under the trademark DE-83; Oncor 55 was antimony trioxide supported on 55 percent by weight of talc and was obtained from Anzon America, Inc., polytetrafluoroethylene resin was obtained from DuPont under the trademark Teflon-K; and the acrylic resin was obtained from the DuPont Company under the trademark Lucite.

The compositions were prepared by weighing the various components, placing the weighed components into a drum and tumble blending the components at room temperature. Thereafter the blended composition was melt extruded at approximately 250° C. and injection molded into specimens.

The measurements of the electrical properties, arc resistance and tracking resistance are carried out on molded discs in accordance with standard procedure. Arc resistance is measured in accordance with ASTM-D-495 as time in seconds the polymer composition can withstand the application of high voltage, low current electricity without deterioration. Tracking resistance, in terms of comparative tracking index (CTI), is measured in accordance with VDE(DIN-53480) and as volts of electricity which may be applied before tracking takes place in the polymer sample. It is to be noted that the maximum voltage that can be measured is 600 volts. The mechanical properties are measured by known standard ASTM procedures.

Examples 1 and 2 were further subjected to an aging test. The aging test is an accelerated test wherein samples are soaked in water at a temperature of 73° F. for 6 days, after which the arc resistance of the samples were again measured. It can be observed that in Example 1 containing no polyethylene terephthalate, the arc resistance decayed by about 10 percent, whereas in Example 2, the arc resistance remained constant.

EXAMPLES 5-9

Samples 5-9 were prepared in the same manner as in Examples 1 to 4 except the level of fiber glass and talc were varied and polyethylene terephthalate was omitted from the composition. The data is presented in Table II. It is observed that arc resistance decayed on aging.

TABLE II

| FORMULATION | 5 | 6 | 7 | 8 | 9 |
|---|---|---|---|---|---|
| PBT | 39.60 | 44.60 | 39.60 | 39.60 | 39.60 |
| Fiber Glass | 20.0 | 20.0 | 25.0 | 20.0 | 20.0 |
| Talc | 30.0 | 30.0 | 25.0 | 25.0 | 20.0 |
| Mica | — | — | — | — | — |
| DBDPE | 4.85 | 4.85 | 4.80 | 4.85 | 4.85 |
| Oncor 55 | 4.85 | 4.85 | 4.85 | 4.85 | 4.85 |
| Teflon-K | 0.5 | 0.5 | 0.5 | 0.5 | 0.5 |
| Acrawax | 0.2 | 0.2 | 0.2 | 0.2 | 0.2 |
| Electrical Properties | | | | | |
| Arc Resistance, sec. | | | | | |
| Initial | 182 | 182 | 181 | 182 | 168 |
| After Aging | 164 | 129 | 144 | 129 | 131 |
| CTI, volts | ≧600 | 570 | ≧600 | 570 | 550 |
| Mechanical Properties | | | | | |
| Tensile strength, psi | 9,900 | 13,300 | 11,500 | 13,300 | 11,300 |
| Tensile elongation, % | 0.6 | 1.2 | 0.7 | 1.2 | 0.7 |
| Flexural strength, psi | 15,800 | 20,300 | 17,800 | 20,300 | 17,200 |
| Flexural modulus, psi | $1.9 \times 10^6$ | $1.69 \times 10^6$ | $1.9 \times 10^6$ | $1.69 \times 10^6$ | $2.0 \times 10^6$ |
| Notched Izod, ft-lb/in. | 0.8 | 0.9 | 0.9 | 0.9 | 0.8 |
| Flammability | V-O | V-O | V-O | V-O | V-O |

EXAMPLES 10-14

Examples 10 to 14 with varying levels of polyethylene terephthalate were prepared using the same procedure as in Examples 1-4. In addition to the accelerated aging test described for Examples 1 and 2, another test was also conducted. Samples were left standing at room temperature for 30 days, 60 days and 90 days intervals and their arc resistance were measured. The data is presented in Table III.

TABLE III

| FORMULATION | 10 | 11 | 12 | 13 | 14 |
|---|---|---|---|---|---|
| PBT | 38.6 | 34.6 | 32.1 | 29.6 | 24.6 |
| PET | 1.0 | 5.0 | 7.5 | 10.0 | 15.0 |
| Fiber Glass | 20.0 | 20.0 | 20.0 | 20.0 | 20.0 |
| Talc | 30.0 | 30.0 | 30.0 | 30.0 | 30.0 |
| DBDPE | 4.85 | 4.85 | 4.85 | 4.85 | 4.85 |
| Oncor 55 | 4.85 | 4.85 | 4.85 | 4.85 | 4.85 |
| Teflon-K | 0.5 | 0.5 | 0.5 | 0.5 | 0.5 |
| Acrawax | 0.2 | 0.2 | 0.2 | 0.2 | 0.2 |
| Electrical Properties | | | | | |
| Arc Resistance, sec. | | | | | |
| Initial | 182 | 182 | 182 | 182 | 182 |
| 30 Days | 182 | 182 | 182 | 183 | 182 |
| 60 Days | 155 | 182 | 182 | 182 | 182 |
| 90 Days | 161 | 174 | 182 | 182 | 182 |
| Aging Test | 176 | 182 | 182 | 182 | 182 |
| CTI, volts | $\geq 600$ | $\geq 600$ | $\geq 600$ | $\geq 600$ | $\geq 600$ |
| Mechanical Properties | | | | | |
| Tensile strength, psi | 12,500 | 12,900 | 12,600 | 11,800 | 11,800 |
| Tensile elongation, % | 0.8 | 0.6 | 0.7 | 0.6 | 0.6 |
| Flexural strength, psi | 20,100 | 19,300 | 18,900 | 18,600 | 18,900 |
| Flexural modulus, psi | $2.0 \times 10^6$ | $2.2 \times 10^6$ | $1.9 \times 10^6$ | $2.3 \times 10^6$ | $1.9 \times 10^6$ |
| Notched Izod, ft-lbs/in. | 0.8 | 0.8 | 0.8 | 0.8 | 0.9 |

As can be observed, the addition of at least about 3 percent of polyethylene terephthalate is required of the composition according to this invention.

On Table IV, the properties of Example 2 are compared with themosetting molding resins, such as diallyl phthalate (DAP) resins and glass filled alkyd resins, and glass filled polybutylene terephthalate resin composition. It can be observed that the properties, mechanical and electrical compare very favorably with the thermosetting molding resins.

Although the invention has been described with preferred embodiments, it is to be understood that variations and modifications may be resorted to, which will be apparent to those skilled in the art. Such variations and modifications are to be considered within the scope and purview of the claims appended hereto. It is to be understood also that the percent weight of the components is based on the total weight of the composition.

TABLE IV

| COMPARISON OF THERMOSETS AND CELANEX | | | | |
|---|---|---|---|---|
| | DAP | Glass filled Alkyd | Glass filled PBT | Example 2 |
| Mechanical Property | | | | |
| Tensile strength, psi | 6,000~11,000 | 4,000~9,500 | 19,500 | 11,700 |
| Tensile elongation, % | | | 1~2 | 0.7 |
| Flexural strength, psi | 1,000~25,000 | 15,000~32,000 | 28,000 | 17,200 |
| Flexural modulus, psi | | $2.0 \times 10^6$ | $1.5 \times 10^6$ | $2.0 \times 10^6$ |
| Notched Izod, ft-lb/in. | 0.4~15.0 | $0.6 \sim 10^6$ | 1.3 | 0.8 |
| Electrical property | | | | |
| Arc Resistance, sec. | 126~180 | 150~210 | 123 | 182 |
| CTI, volts | — | 600~800 | 235 | $\geq 600$ |

I claim:

1. A non-burning, non-dripping polyester molding composition with a sustained high level of arc resistance and tracking resistance, comprising:
   (A) approximately 30 to 60 percent by weight of the composition a mixture of polybutylene terephthalate and polyethylene terephthalate wherein polyethylene terephthalate comprises approximately 3 to 20 percent by weight of the composition;
   (B) approximately 30 to 60 percent by weight of the composition of a mixture of talc and fiber glass wherein said talc comprises about 15 to 35 percent by weight of the composition; and
   (C) an effective amount, up to 20 percent by weight of the composition of a flame retardant or flame retardant mixture to render the composition non-burning.

2. A non-burning, non-dripping polyester molding composition according to claim 1, wherein polyethylene terephthalate comprises approximately 5 to 15 percent by weight of the composition.

3. A non-burning, non-dripping polyester composition according to claim 1, wherein polyethylene terephthalate comprises approximately 10 percent by weight of the composition.

4. A non-burning, non-dripping polyester molding composition according to claim 1, 2 or 3 wherein talc comprises 25 to 35 percent by weight of the composition.

5. A non-burning, non-dripping polyester molding composition according to claim 4, wherein the flame retardant mixture comprises decabromodiphenylether, antimony trioxide and polytetrafluoroethylene.

6. A non-burning, non-dripping polyester molding composition according to claim 5, wherein the flame retardant mixture comprises about 5% by weight of decarbromodiphenylether, about 5% by weight of Oncor 55 and 0.5 to 2.5 percent by weight polytetrafluoroethylene.

7. A non-burning, non-dripping polyester molding composition according to claim 6 further comprising a mold release agent.

8. A non-burning, non-dripping polyester composition characterized by having at least 150 sec. arc resistance and at least 400 volts comparative tracking index, wherein the arc resistance will not substantially decay upon storage at ambient conditions comprising approximately 2 to 20 percent by weight of the composition of decabromodiphenylether,
  (A) approximately 35 to 50 percent by weight of the composition of a blend of polybutylene terephthalate and polyethylene terephthalate wherein polyethylene terephthalate comprises approximately 5 to 15 percent by weight of the composition;
  (B) approximately 40 to 60 percent by weight of the composition a mixture of talc and fiber glass, wherein talc comprises approximately 25 to 35 percent by weight of the composition;
  (C) a flame retardant mixture comprising approximately 2 to 10 percent by weight of the composition of Oncor 55 and approximately 0.2 to 2.5 percent by weight of the composition of Teflon, and approximately 0.1 to 1 percent by weight of the composition of a mold release agent.

9. A non-burning, non-dripping polyester composition according to claim 8, wherein polyethylene terephthalate comprises approximately 10 percent by weight of the composition, and wherein talc comprises approximately 30 percent by weight of the composition.

10. A method to decrease the decay of arc resistance with time by the incorporation of approximately 3 to 20 percent by weight of the composition of polyethylene terephthalate into a non-burning, non-dripping polybutylene terephthalate molding composition comprising:
  (A) approximately 20 to 55 percent by weight of the composition of polybutylene terephthalate;
  (B) approximately 30 to 60 percent by weight of the composition of a mixture of talc and fiber glass wherein talc comprises approximately 15 to 35 percent by weight of the composition; and
  (C) an effective amount, up to approximately 20 percent by weight of the composition of a flame retardant or flame retardant mixture to render the composition non-burning.

11. A method to decrease the decay of arc resistance with time according to claim 10 wherein approximately 5 to 15 percent by weight, based on the composition, of polyethylene terephthalate is incorporated.

12. A method to decrease the decay of arc resistance with time according to claim 10 wherein approximately 10 percent by weight, based on the composition, of polyethylene terephthalate is incorporated.

13. A method to decrease the decay of arc resistance with time according to claim 10 wherein talc is approximately 25 to 35 percent by weight.

* * * * *